United States Patent
Nishimura et al.

(10) Patent No.: US 7,076,576 B2
(45) Date of Patent: Jul. 11, 2006

(54) DATA TRANSFER IN MULTI-NODE COMPUTER SYSTEM

(75) Inventors: Yukio Nishimura, Ishikawa-ken (JP); Prabhunandan B. Narasimharmurthy, Fremont, CA (US); Sudheer Miryala, San Jose, CA (US); Kazunori Masuyama, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 809 days.

(21) Appl. No.: 10/114,525

(22) Filed: Apr. 1, 2002

(65) Prior Publication Data

US 2003/0023906 A1 Jan. 30, 2003

Related U.S. Application Data (60) Provisional application No. 60/299,579, filed on Jun. 19, 2001.

(51) Int. Cl.
*G06F 13/00* (2006.01)

(52) U.S. Cl. .................. 710/33; 709/201; 709/250; 709/231; 709/240; 712/28; 370/401

(58) Field of Classification Search ................. 709/250, 709/251, 226, 223, 224, 231–234, 240; 710/5–6, 710/11–12, 15–20, 29–33, 46–47; 370/400–405; 712/28–31
See application file for complete search history.

(56) References Cited

U.S. PATENT DOCUMENTS

| | | | | |
|---|---|---|---|---|
| 5,021,942 A | * | 6/1991 | Watson et al. | 712/201 |
| 6,009,490 A | * | 12/1999 | Fukui et al. | 710/113 |
| 6,301,256 B1 | * | 10/2001 | Vasa | 370/401 |
| 6,389,526 B1 | * | 5/2002 | Keller et al. | 712/30 |
| 6,772,298 B1 | * | 8/2004 | Khare et al. | 711/144 |
| 2001/0005873 A1 | * | 6/2001 | Yasuda et al. | 710/129 |
| 2003/0012136 A1 | * | 1/2003 | Walles | 370/229 |
| 2004/0054855 A1 | * | 3/2004 | Yasuda et al. | 711/147 |

\* cited by examiner

*Primary Examiner*—Christopher B. Shin
(74) *Attorney, Agent, or Firm*—Fenwick & West LLP (57) ABSTRACT

A method and system transfers data between intra-node firmware and inter-nodes firmware in a multi-node computer system using reduced hardware resources. A set of control codes and data transfer functions are provided to enable data communications between computer nodes and inter-nodes controller through a one-byte control module and a one-byte data module.

20 Claims, 8 Drawing Sheets

DATA TRANSFER IN MULTI-NODE COMPUTER SYSTEM

RELATED APPLICATION

This application claims priority under 35 U.S.C. §119(e) to co-pending U.S. Provisional Patent Application Ser. No. 60/299,579, entitled "Simple Data Transfer Method During Normal and Error Condition with Minimum Hardware Resource Between Intra-Node Firmware and Inter-Nodes Firmware in a Multi-Node System," filed on Jun. 19, 2001, by Yukio Nishimura, et al., the subject matter of which is incorporated herein in its entirety by this reference.

FIELD OF THE INVENTION

The present invention relates generally to a multi-node computer system, and more particularly to a method and system to transfer data between intra-node firmware and inter-nodes firmware of a multi-node computer system.

BACKGROUND OF THE INVENTION

Figure 7:
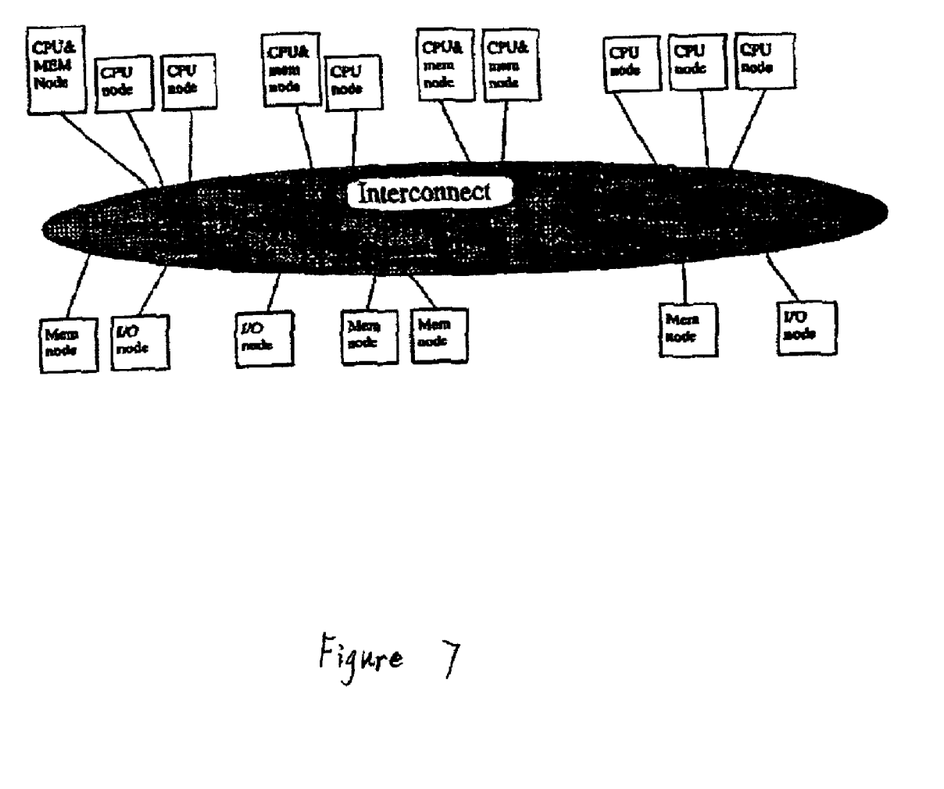
FIG. 7 illustrates a conventional interconnect-based multi-node computer system.

Multi-node computer system includes multiple central processing unit (CPU) nodes, memory nodes, and input/output (IO) nodes as illustrated in FIG. 7. These CPU nodes, memory nodes, and IO nodes can be coupled together through an interconnect.

The multiple CPU nodes usually connect to an inter-nodes controller to transfer data or message related to various system management tasks. Conventional multi-node computer system usually establishes a direct channel between each CPU node and the inter-nodes controller to control and complete the data transfer. In order to do this, a CPU node in a conventional system uses shared four bytes registers, including a one-byte command register, a one-byte status register, a one-byte data-in register and a one-byte data-out register. However, such hardware configuration wastes hardware resources and causes other implementation problems for a multi-node computer system. For example, conventional CPU nodes use their scratch registers to send or receive data. As a result, the scratch registers in each CPU node may not be available for any other purposes. It is therefore desirable to provide a simple data transfer mechanism for CPU node and the inter-nodes controller in a multi-node computer system that uses minimum hardware resources and eliminates the difficulties encountered in conventional multi-node computer systems.

SUMMARY OF THE INVENTION

A preferred embodiment of the present invention unifies a conventional command register and a status register into a one-byte control module, and unifies a data-in register and data-out register into a one-byte data module. This substantially reduces hardware resource by using two bytes hardware for enabling data transfer between the intra-node firmware and the inter-nodes firmware.

Further, there is provided a method to use a plurality of control codes and data transfer functions to instruct the intra-node firmware and the inter-nodes firmware to transfer data using the two bytes data module and control module. The data transfer mechanism is capable of handling multiple prioritized data between intra-node firmware and inter-nodes firmware. A data transfer routine at higher priority can interrupt or suspend a current data transfer at lower priority to ensure the transfer of higher prioritized data. The interrupted data transfer may be resumed or retried later.

DETAILED DESCRIPTION OF THE PREFERRED EMBODIMENTS

Figure 1A:
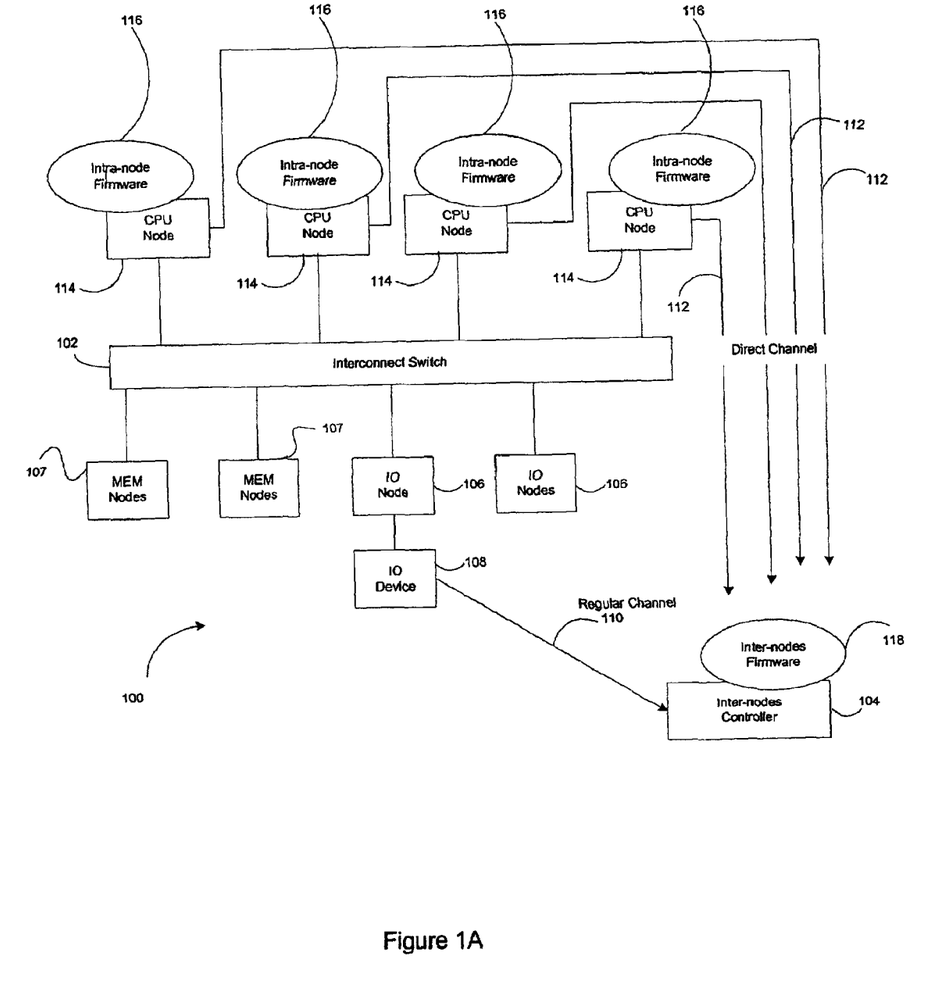
FIG. 1A is schematic diagram of an embodiment of a multi-node computer system in accordance with the present invention.

FIG. 1A shows a multi-node computer system 100. The system 100 includes a plurality of nodes, such as central processing unit (CPU) nodes 114, memory (MEM) nodes 104 and Input/Output (IO) nodes 106, an interconnect switch 102 and an inter-nodes controller 104. The nodes elements, such as CPU nodes 114 and IO nodes 106, are connected via interconnect switch 102. CPU nodes 114 are connected to inter-nodes controller 104 via channel connections as illustrated below. IO node 106 contains at least one IO devices 108. In multi-node computer system 100, each node 114, 106 may be implemented on a separate computer chip, computer board, or stand-alone unit. The interconnect switch 102 may be, for example, a global interconnect, or include a router, to switch requests and data among nodes 114, 106 for various computer applications. Examples of applications of system 100 include server applications.

FIG. 1A also refers to all software and hardware that are included in a CPU node 114 as intra-node firmware 116. Intra-node firmware 116 enables each CPU node 114 to perform intended functions such as distributed computing, Input/Output read/write operations with IO devices 108. Such intro-node firmware may be conventional, but to effectively operate within the multi-node computer architecture, each intra-node firmware 116 is typically coupled to inter-nodes controller 114 which performs system initialization, error handling, domain partitioning, and the like. For the purpose of description, all the software and related hardware in inter-nodes controller 114 is referred to as inter-nodes firmware 118. Inter-nodes firmware 118 is capable of managing the operation of CPU nodes 114 and IO nodes 106. For example, inter-nodes firmware 118 is responsible for system initialization and error logging. Inter-nodes firmware 118 can initialize memory nodes 107, IO nodes 106 and inter-nodes controller 104. Inter-nodes firmware 118 can also observe the nodes temperature or voltage fans, etc. To accomplish these tasks, inter-nodes firmware 118 and intra-node firmware 116 typically communicate with each other through a data and control channel as described below in more detail with reference with FIGS. 1A and 1B.

FIG. 1A shows two types of the data and control channel, namely a regular channel 110 and a direct channel 112. Regular channel 110 in a multi-node computer system 100 involves interconnect switch 102, IO node 106 and IO device 108. Typically, regular channel 110 couples inter-nodes firmware 118 with an IO device 108 within an IO node 106. Current implementation of regular channel 110 in a multi-node computer system is not reliable and its operation requires initialization of system 100. Thus, in a preferred embodiment of system 100, direct channel 112 is provided to couple inter-nodes firmware 118 with intra-node firmware 116. Direct channel 112 between intra-node firmware 116 and inter-node firmware 118 provides a reliable data transfer mechanism for a variety of purposes, such as error logging and system management information collection.

Figure 1B:
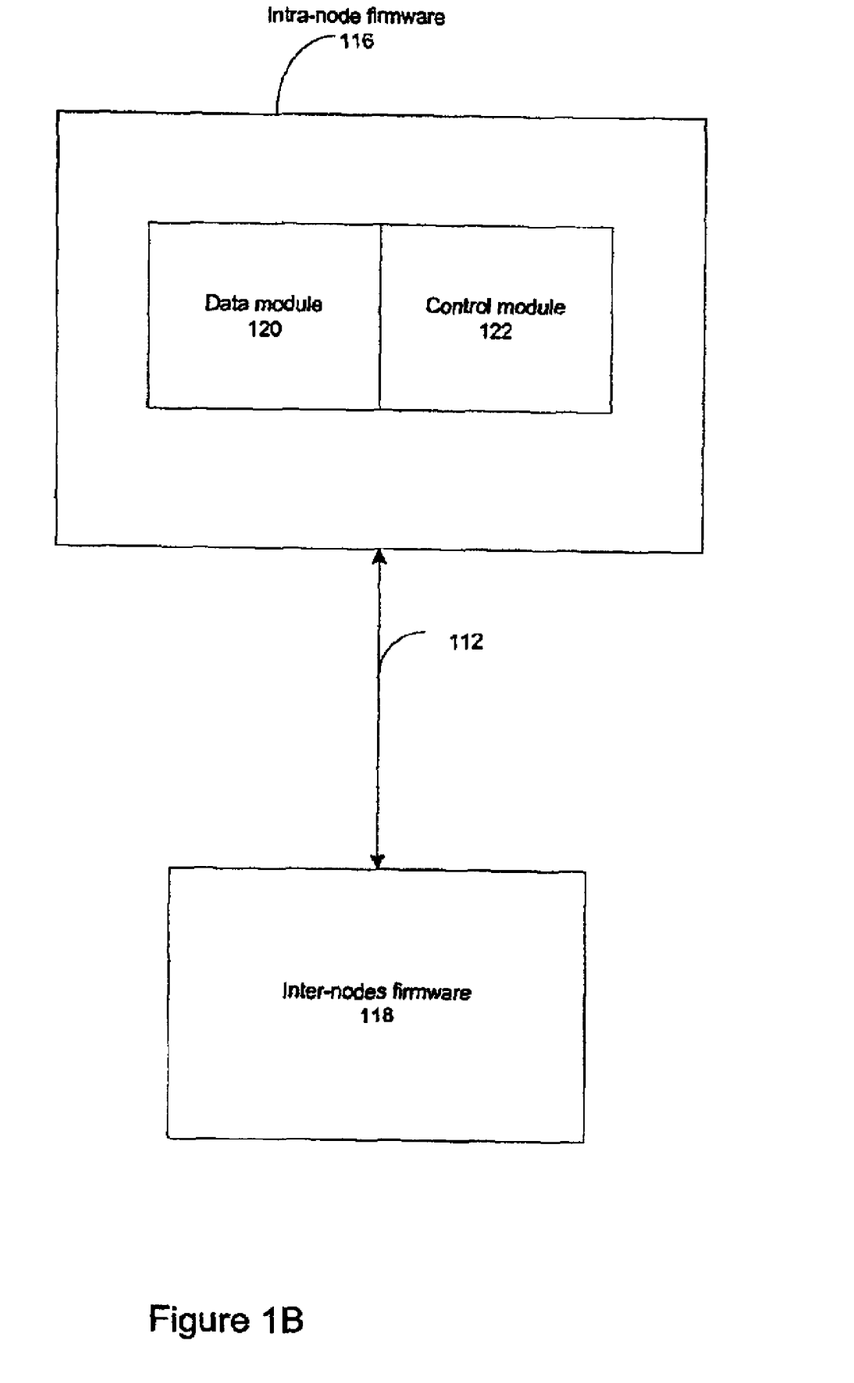
FIG. 1B is a block diagram illustrating a data transfer structure between intra-node firmware and inter-nodes firmware in a multi-node computer system in accordance with an embodiment of the present invention.

FIG. 1B is a schematic diagram illustrating one intra-node firmware 116 coupling with inter-nodes firmware 118 through direct channel 112. In a multi-node system 100, the number of direct channels 112 is equivalent to the number of CPU nodes 106, i.e., each CPU node 106 is coupled to inter-nodes controller 104 through one direct channel 112. To establish the communications, intra-node firmware 116 includes a data module 120 and a control module 122. Data module 120 stores data to be transferred between intra-node firmware 116 and inter-nodes firmware 118. Such data may be error information, nodes performance level, nodes configuration information, front panel message information and watchdog information, which need to be reported to inter-nodes firmware 118. Inter-nodes firmware 118 may also send data to intra-node firmware 116 to perform specific operations according to the needs of system management. Control module 122 stores a plurality of control codes that correspond to various commands and status information related to data transfer between intra-nodes firmware 116 and interconnect controller 104. As will be illustrated below, the control codes provided by a preferred embodiment of the present invention enable a data transfer mechanism handling multiple prioritized data using a minimum hardware cost for multi-node computer system 100.

In a preferred embodiment, the size of each data module 120 and control module 122 is just 1 byte. To implement this embodiment, modules 120 and 122 can be scratch registers that is commonly used in CPU node 114, or any other conventional memory devices that are shared to use with other components of CPU node 114. For each direct channel 112, only 2-byte registers or memories are needed according to the present invention. By doing so, the present invention eliminates the requirement of using 4-byte registers to perform data transfer between intra-node firmware 116 and inter-nodes firmware 118. This eases the hardware requirement for CPU node 116 and results in substantially lower hardware cost while providing a full capability of multi-prioritized data transfer.

During the operation of system 100, as will be described below in more detail with reference to FIGS. 2 and 3, when intra-node firmware 116 needs to send higher prioritized data to inter-nodes firmware 118, e.g., an error report by a CPU node 114, the data transfer mechanism provided herein can start an interrupting routine to interrupt or suspend a current data transfer routine while it is in progress between firmware 116 and firmware 118. In one embodiment, to start the data communication, intra-node firmware 116 sends an interrupt signal to inter-nodes firmware 118. Inter-nodes firmware 118 then reads a control command from control module 122 and retrieve data from or send data to data module 120. After inter-nodes firmware 118 finishes up one operation as indicated by the control command, inter-nodes firmware 118 can return a status code to control module 122 so that intra-node firmware 116 can know what is to do next. By doing so, the interrupting routine at higher priority can then deliver higher prioritized data to or receive from firmware 118. At the same time, the context of the suspended data transfer can be stored temporarily and restored later after the higher prioritized data transfer is completed as will be described below with reference to FIGS. 4 and 5.

In a preferred embodiment, a set of control codes are provided to enable data transfer through the two modules 120, 122. Firmware 116 and 118 can assert these control codes into control module 122 as determined by the need of data transfer. In one embodiment, there may be at least four categories of control codes that are used for controlling data transfer:

(1) control codes indicative of no transaction. For example, a control code "0" shows that there is no transaction occurring between firmware 116 and 118;

(2) control codes corresponding to commands issued from intra-node firmware 116 to inter-nodes firmware 118. For example, control codes 0x01–0x7F hexadecimal, correspond to a plurality of commands that can be sent by intra-node firmware 116 to inter-nodes firmware 118;

(3) controls codes corresponding to status information sent from inter-nodes firmware 118 to intra-node firmware 116. For example, control codes, 0xC0–0xEF hexadecimal, indicate various status of inter-nodes firmware 118 performing the command issued by intra-node firmware 116; and (4) control codes corresponding to status information set by intra-node firmware 116. In certain conditions, e.g., errors occurring to data transfer, intra-nodes firmware 116 may choose not to resume an interrupted data transfer but abort such interrupted data transfer between firmware 116 and firmware 118. Later firmware 116 can retry the aborted data transfer.

Note that the above embodiment of the present invention does not specify a particular set of control codes for inter-nodes firmware 118 to issue commands to intra-node firmware 116. This helps to simplify firmware implementation. If inter-nodes firmware 118 needs to command a data transfer, inter-nodes firmware 118 can send an interrupt signal to intra-nodes firmware 116. Intra-nodes firmware 116 will then receive data from inter-nodes firmware 118 to find out what types of operations are desired by inter-nodes firmware 118.

Table 1 below shows a list of control codes in accordance with an embodiment of the present invention. The left column of table 1 contains the names of control codes; the middle column corresponds to the hexadecimal code as an embodiment of implementing the respective control codes; and the right column indicates which of the four categories the control code belongs to.

TABLE 1

An Example of control code details

| Control code | Control code | Category |
|---|---|---|
| NO_TRANSACTION | 0 | 1 |
| CMD_ABORT | 0x01 | 2 |
| CMD_SSND_FST | 0x20 | 2 |
| CMD_SSND_CNT | 0x21 | 2 |
| CMD_LSND_FST | 0x22 | 2 |
| CMD_LSND_CNT | 0x23 | 2 |
| CMD_LSND_END | 0x24 | 2 |
| CMD_SRCV_FST | 0x40 | 2 |
| CMD_SRCV_CNT | 0x41 | 2 |
| CMD_LRCV_FST | 0x42 | 2 |
| CMD_LRCV_CNT | 0x43 | 2 |
| STS_CMPLT | 0xC0 | 3 |
| STS_NXT_OK | 0xC1 | 3 |
| STS_SDN_CNT_CMD | 0xD0 | 3 |
| STS_ABORTED_BY_SF | 0xF0 | 4 |

The control code in Table 1, "NO_TRANSACTION", represented by 0 hexadecimal, indicates that there is no current interaction between firmware 116 and 118. Intra-node firmware 116 writes this code into control module 122 when a command is performed and completed. When a new interrupting routine reads this control code, such interrupting routines can issue command to control module 122 without aborting any other data transfer.

The control code, "CMD_ABORT", represented by 0x01 hexadecimal, indicates that intra-node firmware 116 is asking inter-nodes firmware 118 to abort a current command. Such control code is required to interrupt a current data transfer in favor of a higher prioritized data transfer. Upon reading this control code, inter-nodes firmware 118 cleans up the context of the current command. The context of a command may include the last data sent or received and the status information.

The control code, "CMD_SSND_FST", represented by 0x20 hexadecimal, typically used in sending data with a length not longer than 256 bytes, indicates that intra-node firmware 116 is sending inter-nodes firmware 118 a first byte of transferred data. In one embodiment, the first byte of transferred data contains the information of the byte length of the data to be transferred in a session. The actual length of the entire data transfer will be the byte length plus 1 taking into account of the first data. In one embodiment, minimum length of transferred data is 1 byte and maximum length is 256 bytes. Upon reading this control code, inter-nodes firmware 118 will read the first byte from data module 120 and allocate memory or registers to receive the incoming data. After related operations corresponding to "CMD_SSND_FST" command is completed, inter-nodes firmware 118 typically responds with a status code "STS_NXT_OK" to control module 122 so that intra-nodes firmware 116 can continue to send next command as described below.

The control code, "CMD_SSND_CNT", represented by 0x21 hexadecimal, typically used in sending data with a length not longer than 256 bytes, indicates that intra-node firmware 116 is sending inter-nodes firmware 118 second or later byte of data. This command will enable intra-nodes firmware 116 to read the data that are now available in data module 120. If the data is not the last byte of the message, inter-nodes firmware 118 responds with the status code "STS_NXT_OK" and then intra-nodes firmware 116 continue to send next data. Inter-nodes firmware 118 will respond with a status "STS_CMPLT" when inter-nodes firmware 118 receives all the data in this session from intra-nodes firmware 116.

The control code, "CMD_LSND_FST", represented by 0x22 hexadecimal, typically used in sending data with a length longer than 256 bytes, indicates that intra-node firmware 116 is sending the first byte of data to the inter-nodes firmware 118. Similar to "CMD_SSND_FST", inter-nodes firmware 118 responds with "STS_NXT_OK" when the command is completed with normal end.

The control code, "CMD_LSND_CNT", represented by 0x23 hexadecimal, typically used in sending data with a length longer than 256 bytes, indicates that intra-node firmware 116 is sending inter-nodes firmware 118 second or later byte of data. Inter-nodes firmware 118 responds with "STS_NXT_OK" when the command is completed with normal end.

The control code, "CMD_LSND_END", represented by 0x24 hexadecimal, typically used in sending data with a length longer than 256 bytes, indicates that intra-node firmware 116 is sending inter-nodes firmware 118 the last byte of the data transfer. Inter-nodes firmware 118 responds with STS_CMPLT when inter-nodes firmware 118 receives all the data in this session.

The control code, "CMD_SRCV_FST", represented by 0x40 hexadecimal, typically used in sending data with a length not longer than 256 bytes, indicates that intra-node firmware 116 is ready to receive from inter-nodes firmware 118 the first byte of data. Again, in one embodiment, the first byte corresponds to the byte length of the data to be received from inter-nodes firmware 118. Minimum length is 1 byte and maximum length is 256 bytes. After inter-nodes firmware 118 reads this command, inter-nodes firmware 118 will send the first byte to data module 120 of intra-nodes firmware 116 and then respond with a status code "STS_NXT_OK" to control module 122. Intra-nodes firmware 116 reads the first byte from data module 120 and prepares to receive remaining data from inter-nodes firmware 118.

The control code, "CMD_SRCV_CNT", represented by 0x41 hexadecimal, typically used in sending data with a length not longer than 256 bytes, indicates that intra-node firmware 116 is receiving from inter-nodes firmware 118 second or later byte of data. Inter-nodes firmware 118 responds with "STS_NXT_OK" before inter-nodes firmware 118 sends the last byte of the information, and with "STS_CMPLT" when inter-nodes firmware 118 sends out all of the data.

The control code, "CMD_LRCV_FST", represented by 0x42 hexadecimal, typically used in receiving data with a length longer than 256 bytes, indicates that intra-node firmware 116 is receiving inter-nodes firmware 118 the first byte of data. Inter-nodes firmware 118 responds with "STS_NXT OK" when the command is completed.

The control code, "CMD_LRCV_CNT", represented by 0x43 hexadecimal, typically used in receiving data with a length longer than 256 bytes, indicates that intra-node firmware 116 is receiving inter-nodes firmware 118 second or later byte of data. Inter-nodes firmware 118 responds with "STS_NXT_OK" before inter-nodes firmware 118 sends the last byte of the information, and with "STS_CMPLT" when inter-nodes firmware 118 sends out all of the data.

The control code, "STS_CMPLT", represented by 0xC0 hexadecimal, indicates that inter-nodes firmware 118 completes the command sequence with a normal end. If inter-nodes firmware 118 has additional commands to complete command sequence, inter-nodes firmware 118 responds with "STS_NXT_OK". Similar to the control code "No_transaction", interrupting routines of intra-node firmware 116 can issue command without any aborting when the interrupting routines read this value, as long as the interrupting routines save/restore previous data register of SMEM scratch register.

The control code, "STS_NXT_OK", represented by 0xC1 hexadecimal, indicates that inter-nodes firmware 118 completed the first or the middle command of the command sequence with normal end. If interrupting routines of intra-node firmware 116 read the "STS_NXT_OK" at control module 122, the interrupting routines need to issue "CMD_ABORT" to abort the current data transfer before it issues any new command to start a higher prioritized data transfer.

The control code, "STS_SDN_CNT_CMD", represented by 0xD0 hexadecimal, indicates that inter-nodes firmware 118 received the second or the later command of the command sequence without the first command. In this situation, inter-nodes firmware 118 has to clean up incomplete command context if any.

The control code, "STS_ABORTED_BY_SF", represented by 0xF0 hexadecimal, is an example of status information issued by intra-nodes firmware 116 itself. As noted above, this control code indicates that intra-node firmware 116 determines to abort the interrupted data transfer routine rather than resuming it later under certain circumstances. For example, when some errors happened to the interrupted data transfer or the context of the interrupted data transfer cannot be saved. Therefore, it is more efficient to abort the interrupted data transfer. Upon receiving this status control code, the interrupted intra-node firmware 116 may retry the aborted command to restart the data transfer.

Note that the above description of control codes is merely an example of commands and status codes that are used to implement the data transfer through the 1-byte data module 120 and control module 122. There are alternative sets of control codes that can enable the data transfer between each intra-node firmware 116 and inter-nodes firmware 118.

Figure 2:
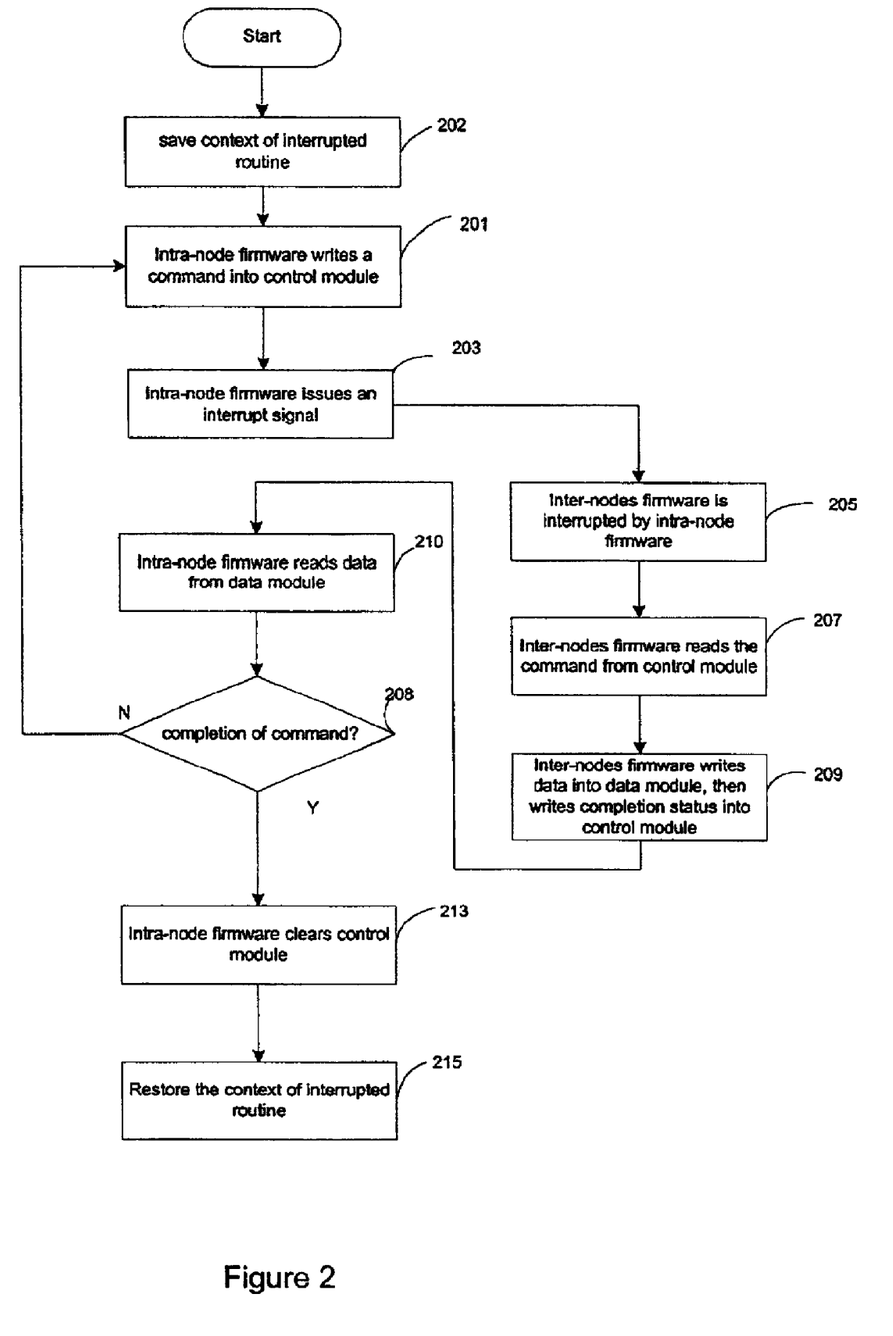
FIG. 2 is a flow chart illustrating a method for intra-node firmware to receive data from an inter-nodes firmware.

FIG. 2 is a flow chart illustrating a method for sending data from intra-node firmware 116 to inter-nodes firmware 118. Such method may be implemented as a function SMreceive that can be called each time by a new interrupting routine to start a data transfer by firmware 116. As illustrated by FIG. 2, when an interrupting routine at intra-nodes 116 calls this function, the context of the current data transfer between an intra-node firmware 116 and inter-nodes firmware 118 is saved 202. Saving context of the current data transfer that is now handled by the inter-nodes firmware 118 can be implemented by a function saveSMEMcontext that will be described in FIG. 4 below in detail. The context-saving of the interrupted data transfer routine will later enable resuming the data transfer after the higher prioritized data transfer is completed.

After the context is saved, intra-node firmware 116 writes 201 a command into control module 122. By way of example, the command may be the code "CMD_SRCV_FST", which represents a command of receiving the first byte of data from inter-nodes firmware 118 as described above. Then intra-node firmware 116 sends 203 an interrupt signal (referred to as SM.INT#) to request inter-nodes firmware 118 to send data to data module 120. While inter-nodes firmware 118 reacts to this SM.INT# and sends the data, intra-node firmware 116 waits 203 until it reads from control module 122 a control code indicating a status of the current command.

On the side of inter-nodes firmware 118, upon receiving the interrupt signal SM.INT# 205, inter-nodes firmware 118 reads 207 the command from control module 122. Since the command "CMD_SRCV_FST" instructs to receive a first byte of the data, inter-nodes firmware 118 writes 209 the first byte of data back into data module 120. As noted above, the first byte of the data correspond to the length of data that is intended to be delivered to intra-node firmware 116 in one session. Intra-node firmware 116 will know how much data will be expected to receive from inter-nodes firmware 116 based on the first byte of the data.

At the same time, inter-nodes firmware 118 will also return 209 a status code into control module 122 after completion of writing the first byte of data into module 120. In the case of command "CMD_SRCV_FST", inter-nodes firmware 118 inserts status "STS_NXT_OK" into control module 122 so that intra-node firmware 116 continues to write next command to receive the remaining data.

Intra-node firmware 116 reads 210 data from data module 120 after receiving the status "STS_NXT_OK". Since "STS_NXT_OK" means the data transfer is still not completed, intra-node firmware 116 goes back to put another command to control module 122 to request next data transfer. For example, firmware 116 now places a command "CMD_SRCV_CNT" into control module 122. Firmware 118 will continue to read this command from module 122 and respond by sending remaining data in the queue. After all the data is sent out for this session, firmware 118 will return a completion status, "STS_CMLT". Once intra-node firmware 116 reads 208 this completion status code in control module 122, it can proceed, intra-node firmware 116 clears control module 122 and restores the previously interrupted command. The restoration of the interrupted data transfer can be implemented by calling a function restoreSMEMcontext as described in FIG. 5.

Figure 3:
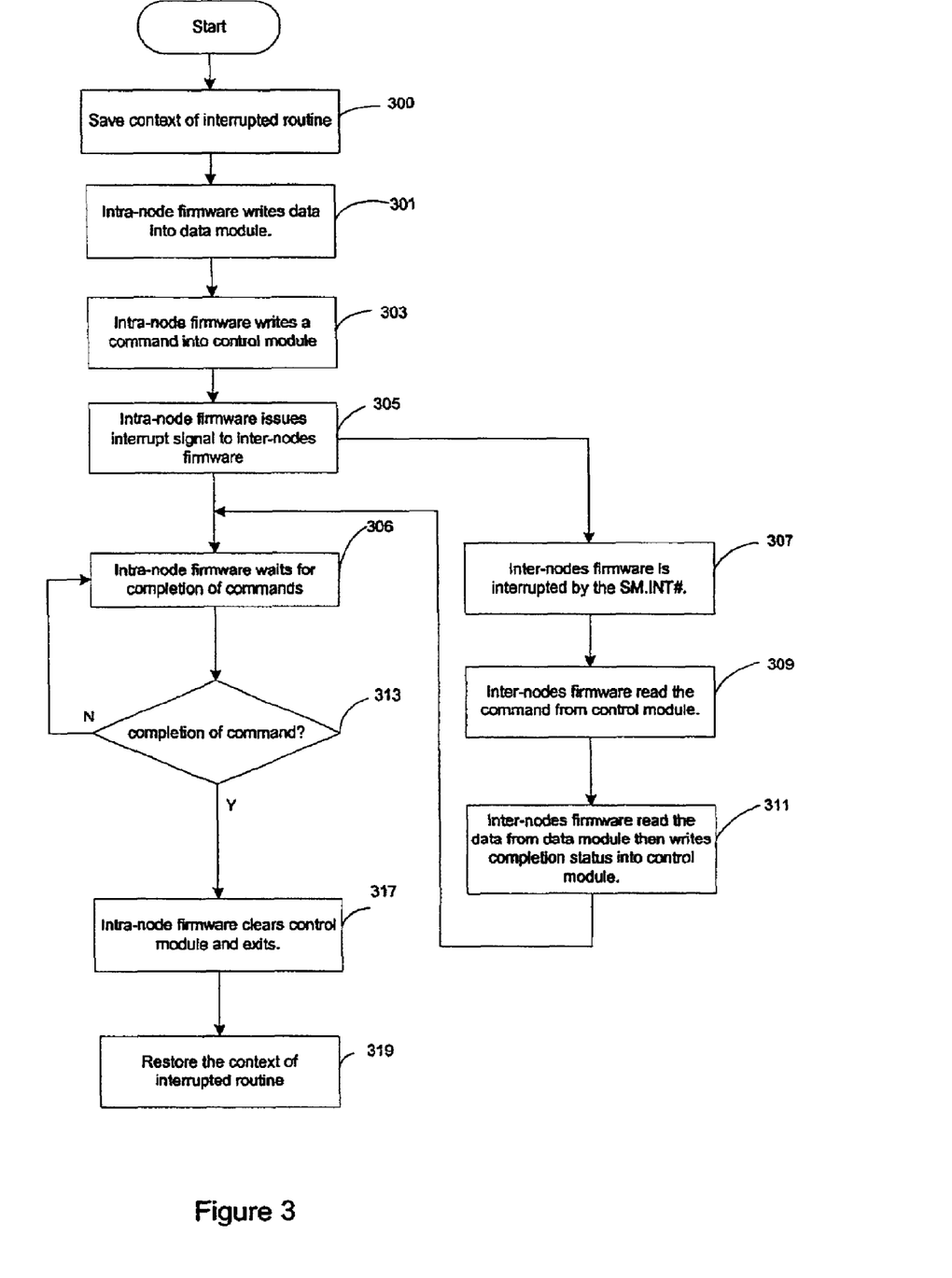
FIG. 3 is a flow chart illustrating a method for sending data from an intra-node firmware to an inter-nodes firmware.

FIG. 3 is a flow chart illustrating a method for sending data from intra-node firmware 116 to inter-nodes firmware 118. This method can be implemented as a function SMsend to be called by a new interrupting routine of intra-node firmware 116. Once the interrupting routine calls for sending data with higher priority from intra-node firmware 116 to intra-node firmware 118, the current data transfer is interrupted and its context is saved 300. As noted above, the context saving can be performed by calling saveSMEMcontext function. Then, intra-node firmware 116 writes 301 a first data into data module 120 and writes 303 a command into control module 122 to instruct inter-nodes firmware 118 to read data from intra-node firmware 116. For example, the command is "CMD_SSND_FST", which requests inter-nodes firmware 118 to receive the first byte of data that is going to be transferred in this session. After the command is written, intra-node firmware 116 then issues 305 the interrupt signal, SM.INT#, to inter-nodes firmware 118.

On the side of inter-nodes firmware 118, the current data transfer being handled by inter-nodes firmware 118 is interrupted 307 by SM.INT#. In response to the interrupt signal, inter-nodes firmware 118 then reads 309 the command from control module 122. By way of example, in the case of the command "CMD_SSND_FST", inter-nodes firmware 118 reads 311 the first byte of data from data module 120 and writes a "STS_NXT_OK" status back into control module 122. As noted above, the first byte of data indicates the length of the data to be transferred. As a result, inter-nodes firmware 118 can prepare to receive remaining data for this session and return a "STS_CMPLT" once it detects all the data have been received from intra-node firmware 116.

On the side of intra-node firmware 116, interrupting routine read status information from control module 122 and detects 313 if it is a "STS_CMLT". If not, intra-node firmware 116 continues to write second byte of data 301 to data module 120 and writes another command, e.g., "CMD_SSND_CNT", to control module 122 so that the second byte of data can be sent to inter-nodes firmware 118. When intra-node firmware 118 returns a status "STS_CMPLT", intra-node firmware 116 clears 317 control module 122 and restores 319 the previously interrupted data transfer.

Note that the use of SM.INT# is not necessary to implement the present invention. In an alternative embodiment, the interrupt signals may be omitted by configuring both inter-nodes firmware 118 and intra-node firmware 116 periodically to poll control module 122. Such polling process may give inter-nodes firmware 118 and intra-node firmware 116 a notice of presence of newly asserted commands or status in control module 122. As a result, inter-nodes firmware 118 and intra-node firmware 116 can read the command and status information in control module 122 to perform the data transfer functions SMsend or SMreceive as described above.

Figure 4:
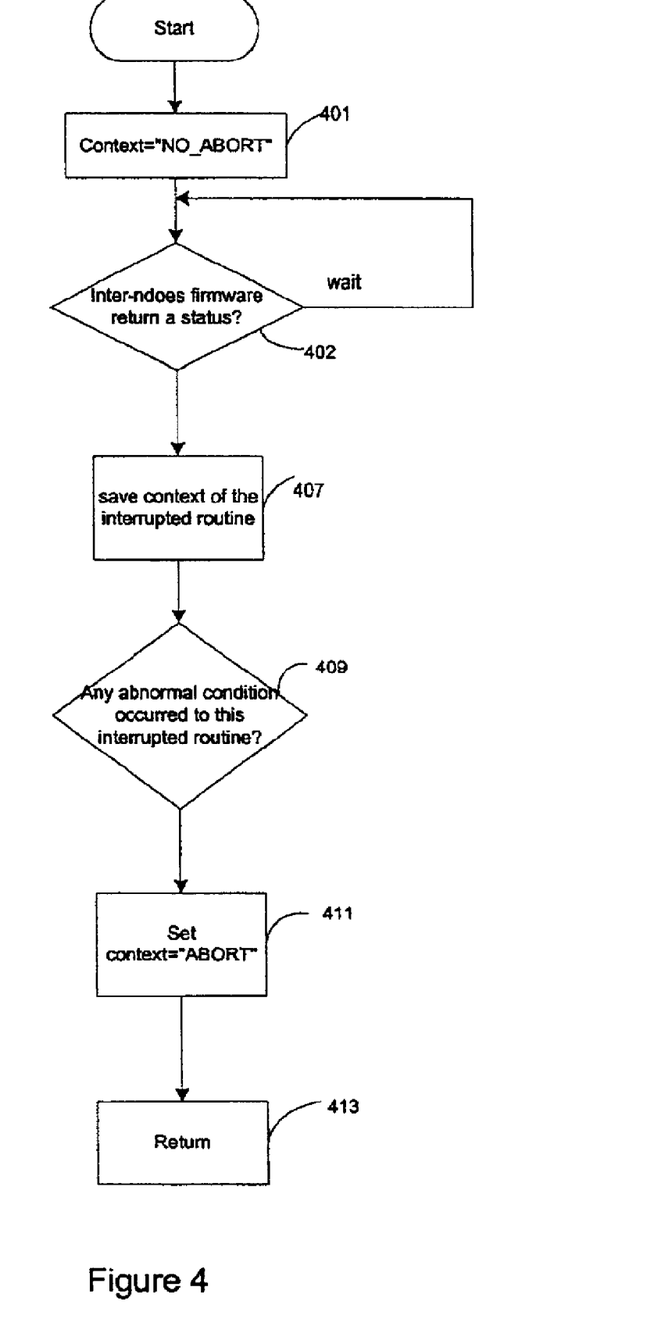
FIG. 4 is a flow chart illustrating a method for saving context of an interrupted routine.

FIG. 4 is a flow chart illustrating a method for saving context of an interrupted routine. As noted above, this method can be implemented by calling a function saveSMEMcontext in an interrupting routine.

In one embodiment, the function saveSMEMcontext starts by setting 401 a context value to be "No_Abort", which presumes every interrupted data transfer should be restored later. Such context value can be changed to "Abort" in special situations. For example, if something abnormal occurred to the current data transfer, there may be no need to restore such data transfer after the interrupting routine is completed. saveSMEMcontext can just set a value to be "Abort" and write a command "CMD_ABORT" to control module 122 so that inter-nodes firmware 118 is alerted to the abortion of the current data transfer. When next time intra-node firmware 116 tries to restore such data transfer and reads the value "Abort", intra-node firmware 116 can simply retry the interrupted data transfer instead of resuming from where it was interrupted.

In another case, to ensure the higher prioritized data transfer can be done in time, the saveSMEMcontext function may issue abort command to inter-nodes firmware 118 if necessary, rather than waiting until receiving firmware 118 writes back status code. Note that such aborted routine in favor of higher prioritized data transfer will not be resumed later. As will be described below, the restoreSMEMcontext function may simply set a "STS_ABORTED_BY_SF" into control module 122 so that this aborted routine can be just retried later.

After setting the value "No_Abort", if the interrupted routine is in progress, intra-node firmware 116 waits until inter-nodes firmware 118 writes any status information into control module 122. After the status is written into the control module 122 and new command of the interrupted routine is placed at control module 122, intra-node firmware 116 sets SM.INT# 407 to be "On", which interrupts the process of sending this command to inter-nodes firmware 118 or prevents inter-nodes firmware 118 from returning any status code into control module 122. Further, intra-nodes firmware 116 then saves 407 the context of current data transfer by saving current control codes in control module 122 and current data in data module 120 into a predetermined place. Such predetermined place may be shared memories or registers at CPU node 114. These saved information will later be retrieved to resume the interrupted routine.

At step 409, as mentioned above, it is determined whether there is any abnormal condition associated with the interrupted routine. If some error information is in control module 122, a value "Abort" may be set to abort the interrupted routine. After the context of the interrupted routine is saved, saveSMEMcontext returns to the interrupting routine, which starts to perform the prioritized data transfer.

Figure 5:
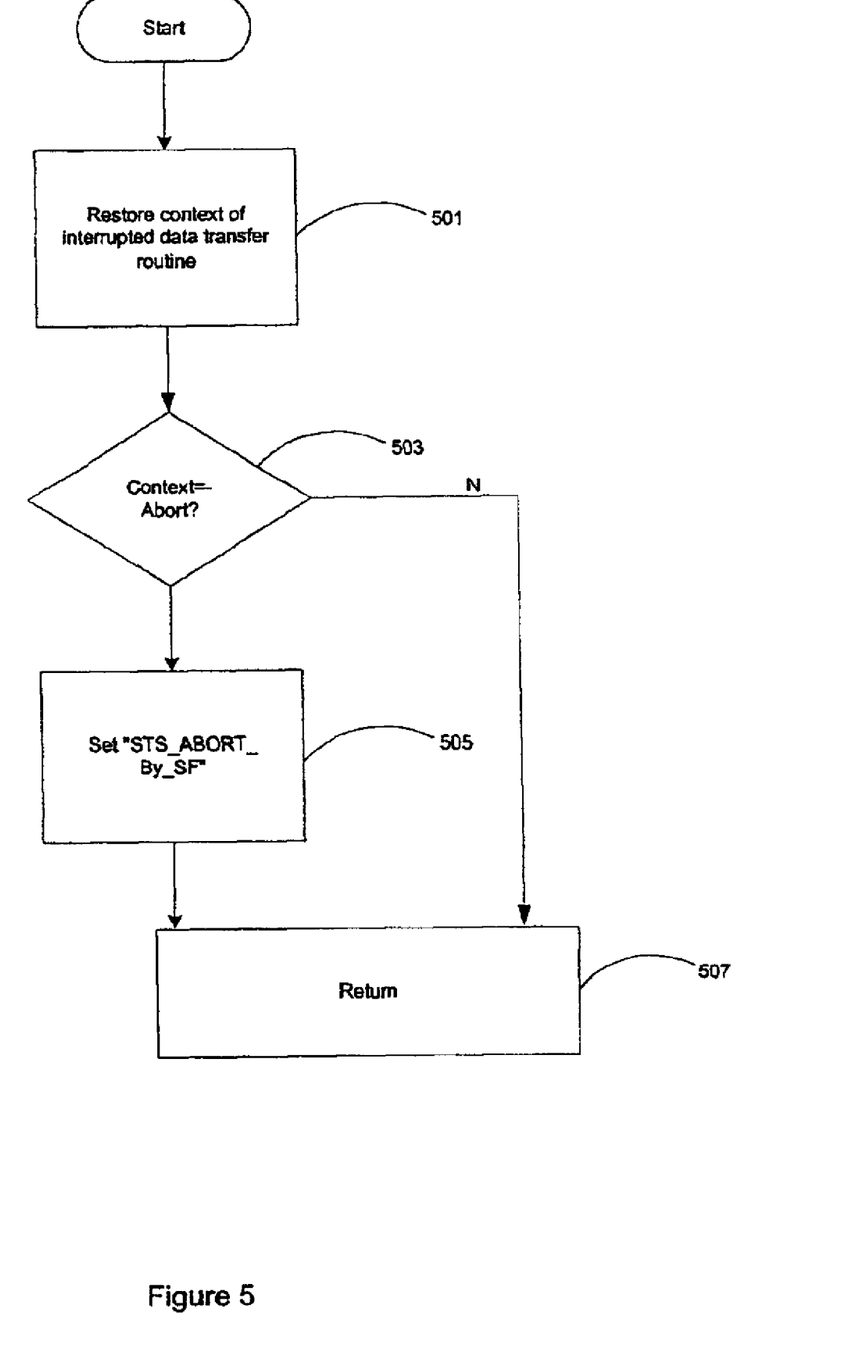
FIG. 5 is a flow chart illustrating a method for restoring context of an interrupted routine.

FIG. 5 is a flow chart illustrating a method for restoring a context of an interrupted routine. As described above in FIGS. 3 and 4, after the higher prioritized data transfer is completed, restoring the previously interrupted is preferred. In order to do so, the context of the interrupted data transfer is restored 501 to data module 120 and control module 122.

On the other hand, if the context of the interrupted routine contains 503 the value "Abort", the interrupted routine will not be resumed. Instead, a status "STS_ABORTED_BY_SF" is written 505 into control module 122. As noted above, the status code "STS_ABORTED_BY_SF" will instruct intra-node firmware 116 not to resume the data transfer but retry the entire data transfer. By doing so, potential errors related to the interrupted data transfer are avoided.

In an alternative embodiment, where the status "STS_ABORTED_BY_SF" may possibly be overwritten by a subsequent command when restoring the interrupted routine such that the restored routine has no knowledge of the status, inter-nodes firmware 118 may treat any subsequent commands following the status code "STS_ABORTED_BY_SF" as error. Inter-nodes firmware 118 thus returns a status code "STS_SDN_CNT_CMD" as noted above to dictate a retry of the interrupted routine from its first command.

In another alternative embodiment, the present invention may configure intra-node firmware 116 not to interrupt any current data transfer to simplify the implementation. Any new or even higher prioritized data transfer waits until the current data transfer is completed with a normal end. In this embodiment, the present invention will not need the functions of saving or restoring context.

Figure 6:
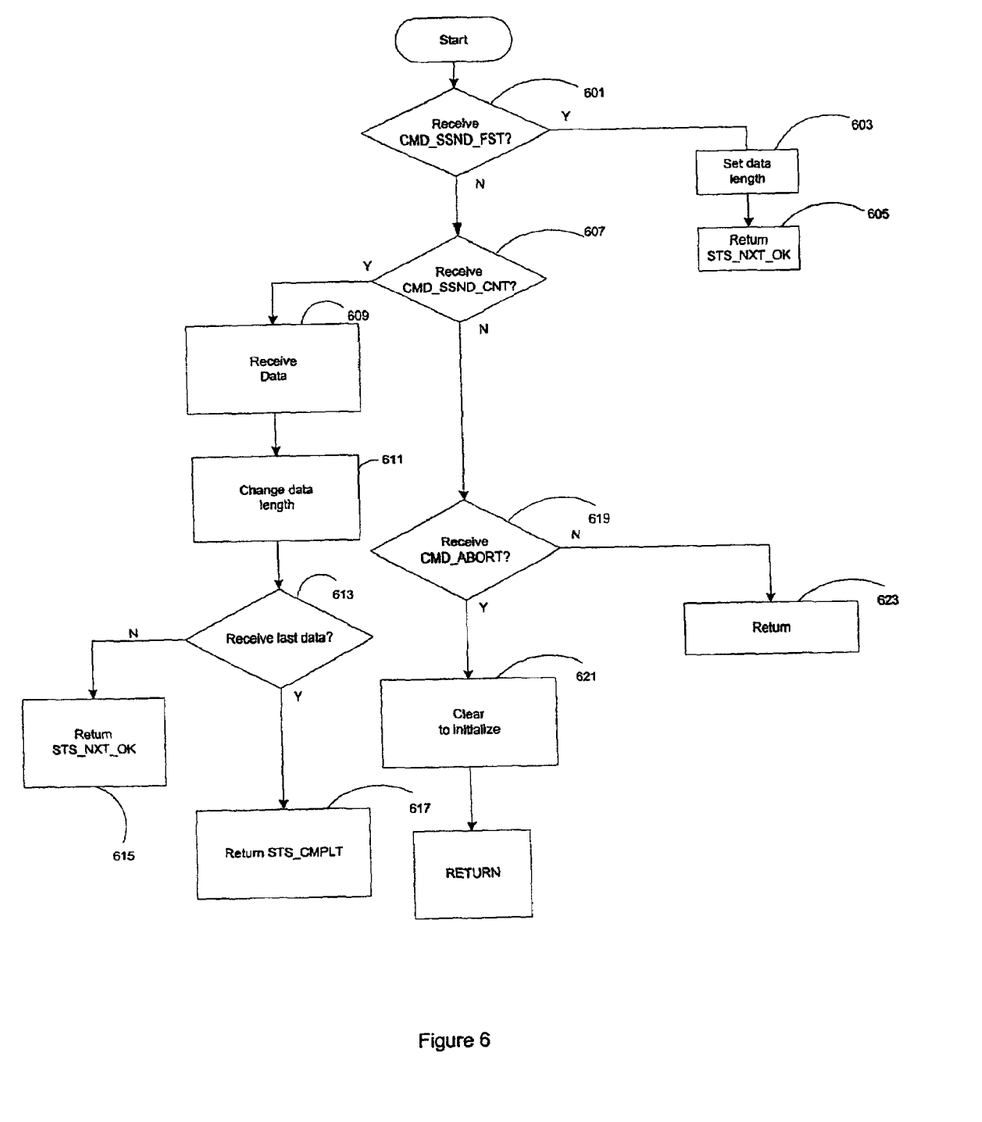
FIG. 6 is a flow chart illustrating a method for interface handling by an inter-nodes firmware.

FIG. 6 is a flow chart showing in detail a method of inter-nodes firmware 118 interfacing with intra-node firmware 116 to process requests initiated by intra-nodes firmware 116. The method can be implemented as a function SMEMINTOUTint that can be called by inter-nodes firmware 118 to handle any requests from intra-node firmware 116. For the ease of understanding, FIG. 6 exemplifies receiving data from intra-node firmware 116. In a typical process of receiving data from intra-node firmware 116 as described above, to interface modules 120, 122 at intra-node firmware 116, inter-nodes firmware 118 first retrieves 601 a command from control module 122. If the command is "CMD_SSND FST" 601, inter-nodes firmware 118 reads the first byte of data from data module 120 and then sets 603 a value of length of data transfer based on the first byte of data. As described above, the first byte of data is the byte length of the data that are going to be transferred in a session. Thus, inter-nodes firmware 118 is alerted to the amount of data that will be received from intra-node firmware 116 in this session.

After the data length is set, inter-nodes firmware 118 returns 605 a status "STS_NXT_OK" to control module 122 to indicate that inter-nodes firmware 118 is ready to receive next data. Next, firmware 118 detects 605 if the command read from control module 122 is a "CMD_SSND_CNT". In the case of "CM_SSN_CNT", inter-nodes firmware 118 continues to read second or later byte of data from data module 120. Correspondingly, the data length counter will be reduced 611 by one. If the data length counter is zero, i.e., the transferred data is the last one, firmware 118 just returns 617 a status "STS_CMPLT". If firmware 118 has not received the whole data, it returns 615 a status "STS_NXT_OK".

If firmware 118 receives 619 the command "CMD_ABORT", it means that the current data transfer is aborted. Firmware 118 then clears up the transaction with firmware 116 and initializes for next data transfer or other operation.

To further exemplify the data transfer between firmware 118 and 116, an example as follows is a description of transferring a message "BSP Selection done! " to firmware 118 using the above methods to transfer data. Table 2 shows the entire data string to be transferred. The first data "12h " represents the length of message "BSP Selection Done.". Thus, the actual length of data to be transferred is 13h hexadecimal.

In one embodiment, to display the message in Table 2, a message display function that is running on firmware 116 calls SMsend function as described above with reference to FIG. 2.

TABLE 2

| 12h | 'B' | 'S' | 'P' | " " | 'S' | 'e' | 'l' | 'e' | 'c' | 't' | 'i' | 'o' | 'n' | " " | 'd' | 'o' | 'n' | 'e' | '.' |
|---|---|---|---|---|---|---|---|---|---|---|---|---|---|---|---|---|---|---|---|

SMsend function acts to send a first data (12h) into data module 120 and to write CMD_SSND_FST, i.e., 20h hexadecimal, into control module 122. The SMsend function then raises an interrupt signal, SM.INT# signal, to inter-nodes firmware 118. Intra-node firmware 116 waits for the status information returned from inter-nodes firmware 118 by polling control module 122 periodically. On the side of inter-nodes firmware 118, the SMEMINTOUTint function, as described above with reference to FIG. 6, handles the interfacing process between firmware 118 and firmware 116. It is interrupted by SM.INT# and then instructs inter-nodes firmware 118 to read the command CMD_SSND FST (20h) from control module 122. Next, inter-nodes firmware 118 reads the data (12h) from data module 120 as requested by CMD_SSND_FST. As mentioned above, inter-nodes firmware 118 is configured to know the command CMD_SSND_FST(20h) to set the message length with 13h (12h+1). SMEMINTOUTint then proceeds to write a control code STS_NXT_OK(C1h) into control module 122. After intra-node firmware 116 polls control module 122 and reads the status (C1h), intra-node firmware 116 de-asserts the SM.INT# signal.

Next, firmware 116 sends the second data, 'B', which is the first letter in the message to be displayed. As described above with reference to FIG. 2, SMsend writes the second data ('B') into data module 120. SMsend function writes a CMD_SSND_CNT(21h) into control module 122 and raises another interrupt signal SM.INT# signal to inter-nodes firmware 118. SMEMINTOUTint function is interrupted by SM.INT# and then reads the command (21h) from control module 122. Upon receiving the command (21h), SMEMINTOUTint function will act according to the command to read the data ('B') from data module 120 and decreases remaining message length by deducting 13h to 12h. Subsequent to the adjustment of the message length, inter-nodes firmware 118 writes a STS_NXT_OK(C1h) into control module 122 to notify intra-node firmware 116 to send next data. Intra-node firmware 116 reads the status (C1h) from control module 122, de-asserts the SM.INT# signal and prepares to send next data.

Similarly, SMsend function acts to send other letters 's' through 'e' as shown in Table 2 in the message to inter-nodes firmware 118. Firmware 118 receives each of the data and decreases the message length. In particular, in receiving the last data '.', inter-nodes firmware 118 completes its process by decreasing remaining message length from 1 to 0. Since the data length is "zero", firmware 118 writing a control code STS_CMPLT(C0h) into control module 122. Therefore, the entire message is successfully transferred from intra-node firmware 116 to inter-node firmware 118. As understood above, such data transfer can be done during a normal condition or an error condition. If such data transfer is placed at higher priority, a current data transfer can be interrupted to ensure this message to be received in time by inter-nodes firmware 118.

Therefore, the present invention reduces hardware resources required for data transfer in a multi-node computer system, with concurrent reduction in hardware development and hardware operation problem. It also makes conventional special mechanism unnecessary, such as placing a busy bit for data transferring. Further, the present invention is capable of handling transferring data with higher priority.

What is claimed is:

1. A method for transferring data from an intra-node firmware to an inter-nodes firmware in a multi-node computer system, the intra-node firmware coupled to the inter-nodes firmware through a direct channel, the intra-node firmware having a control module and a data module, the method comprising:
    sending a first data to the data module by the intra-node firmware;
    sending a first data transfer command to the control module by the intra-node firmware, the first data transfer command enabling the first data to be transferred to the inter-nodes firmware;
    reading the first data transfer command from the control module by the inter-nodes firmware;
    reading the first data from the data module by the inter-nodes firmware in response to the first data transfer command;
    writing a first data transfer status code into the control module by the inter-nodes firmware in response to completion of reading the first data from the data module;
    reading the first data transfer status code from the control module by the intra-node firmware; and
    determining whether to continue the data transfer in response to the first data transfer status code.

2. The method of claim 1, further comprising:
    sending an interrupt signal from the intra-node firmware to the inter-nodes firmware subsequent to sending the data transfer command to the control module by the intra-node firmware.

3. The method of claim 1, further comprising:
    polling the control module by the intra-node firmware to determine the presence of data transfer command prior to reading the transfer command from the control module.

4. The method of claim 1, wherein the first data transfer command corresponds to sending a command indicative of length of data to be transferred.

5. The method of claim 1, further comprising:
    writing a data transfer completion status control code into the control module by the inter-nodes firmware in response to all the data having been sent to the inter-nodes firmware.

6. The method of claim 1, wherein the first data transfer status code corresponds to a data transfer continuation status.

7. The method of claim 1, further comprising:
    storing a context of the data module and control module prior to sending the first data to the data module.

8. The method of claim 7, further comprising:
    restoring the stored context of the data module and control module after all the data have been sent to the inter-nodes firmware.

9. A method for receiving data by an intra-node firmware from an inter-nodes firmware in a multi-node computer system, the intra-node firmware coupled to the inter-nodes firmware through a direct channel, the intra-node firmware having a control module and a data module, the method comprising:

writing a first data transfer command into the control module by the intra-nodes firmware;

reading the first data transfer command from the control module by the inter-nodes firmware;

writing a first data into the data module by the inter-nodes firmware in response to the first data transfer command;

writing a first data transfer status code into the control module in response to writing the first data into the data module; and determining whether to continue the data transfer in response to reading the first data transfer status code.

10. The method of claim 9, further comprising:

sending an interrupt signal from the intra-node firmware to the inter-nodes firmware in response to sending the first data transfer command to the control module.

11. The method of claim 9, wherein the first data transfer command corresponds to a command indicative of length of data to be transferred.

12. The method of claim 9, wherein the first data transfer status code corresponds to a data transfer continuation status.

13. The method of claim 9, further comprising:

writing a data transfer completion status control code into the control module by the inter-nodes firmware in response to all the data having been sent to the inter-nodes firmware.

14. The method of claim 9, further comprising:

storing the context of the data module and control module prior to sending the first data transfer command to the control module.

15. The method of claim 6, further comprising:

restoring the stored context of the data module and control module after all the data have been sent to the inter-nodes firmware.

16. A multi-node computer system, comprising:

an inter-nodes firmware for managing the operation of the multi-node computer system; and a plurality of intra-node firmware, each comprising a one-byte data module and a one-byte control module for enabling a prioritized data transfer routine to operate through the data module and the control module, wherein the prioritized data transfer routine is operative to communicate with the inter-nodes firmware.

17. A method for transferring data from an intra-node firmware to an inter-nodes firmware in a multi-node computer system, the intra-node firmware coupled to the inter-nodes firmware through a direct channel, the intra-node firmware having a control module and a data module, the method comprising the steps of:

sending a first data to the data module;

sending a first data transfer command to the control module for enabling the first data to be transferred to the inter-nodes firmware;

monitoring whether the control module receives a first data transfer status code corresponding to the status of performing the first data transfer command by the inter-nodes firmware; and determining whether to continue the data transfer in response to receiving the first data transfer status code.

18. A method for receiving data by an intra-node firmware from an inter-nodes firmware in a multi-node computer system, the intra-node firmware coupled to the inter-nodes firmware through a direct channel, the intra-node firmware having a control module and a data module, the method comprising:

writing a first data transfer command into the control module for enabling the inter-nodes firmware to send data to the data module in response to the first data transfer command;

monitoring whether the control module receives a first data transfer status code corresponding to the status of performing the first data transfer command by the inter-nodes firmware; and determining whether to continue the data transfer in response to the first data transfer status code.

19. A computer readable medium containing a computer program for enabling communication between intra-node firmware and inter-nodes firmware in a multi-node computer system, the intra-node firmware comprising a data module and a control module, said computer program, when executed by the intra-node firmware, causing the intra-node firmware to perform the steps of:

sending a first data to the data module;

sending a first data transfer command to the control module for enabling the first data to be transferred to the inter-nodes firmware;

monitoring whether the control module receives a first data transfer status code corresponding to the status of performing the first data transfer command by the inter-nodes firmware; and determining whether to continue the data transfer in response to receiving the first data transfer status code.

20. A computer readable medium containing a computer program for enabling communication between intra-node firmware and inter-nodes firmware in a multi-node computer system, the intra-node firmware comprising a data module and a control module, said computer program, when executed by the intra-node firmware, causing the intra-node firmware to perform the steps of:

writing a first data transfer command into the control module for enabling the inter-nodes firmware to send data to the data module in response to the first data transfer command;

monitoring whether the control module receives a first data transfer status code corresponding to the status of performing the first data transfer command by the inter-nodes firmware; and determining whether to continue the data transfer in response to the first data transfer status code.

* * * * *